US012676330B2

(12) United States Patent
Kwak et al.

(10) Patent No.: US 12,676,330 B2
(45) Date of Patent: *Jul. 7, 2026

(54) HIGH-TEMPERATURE PEMFC INCLUDING POLYMER OF INTRINSIC MICROPOROSITY PREVENTING PHOSPHORIC ACID POISONING AND METHOD OF MANUFACTURING THE SAME

(71) Applicants: HYUNDAI MOTOR COMPANY, Seoul (KR); KIA CORPORATION, Seoul (KR); Research & Business Foundation SUNGKYUNKWAN UNIVERSITY, Suwon-si (KR)

(72) Inventors: Da Hee Kwak, Suwon-si (KR); Jee Youn Hwang, Seoul (KR); Won Jae Choi, Seoul (KR); Songi Oh, Suwon-si (KR); Sung Hee Shin, Incheon (KR); Ah Hyeon Park, Suwon-si (KR); Ji Hoon Jang, Suwon-si (KR); Hyoun Myung Park, Incheon (KR); Kyung Su Kim, Incheon (KR); Chang Sik Song, Seoul (KR)

(73) Assignees: HYUNDAI MOTOR COMPANY, Seoul (KR); KIA CORPORATION, Seoul (KR); Research & Business Foundation SUNGKYUNK UNIVERSITY, Suwon-si (KR)

( * ) Notice: Subject to any disclaimer, the term of this patent is extended or adjusted under 35 U.S.C. 154(b) by 703 days.

This patent is subject to a terminal disclaimer.

(21) Appl. No.: 18/087,175

(22) Filed: Dec. 22, 2022

(65) Prior Publication Data

US 2023/0369625 A1 Nov. 16, 2023

(30) Foreign Application Priority Data

May 10, 2022 (KR) ........................ 10-2022-0057315

(51) Int. Cl.
*H01M 8/103* (2016.01)
*H01M 4/86* (2006.01)
(Continued)

(52) U.S. Cl.
CPC ......... *H01M 8/103* (2013.01); *H01M 4/8663* (2013.01); *H01M 4/8892* (2013.01);
(Continued)

(58) Field of Classification Search
None
See application file for complete search history.

(56) References Cited

U.S. PATENT DOCUMENTS 6,946,211 B1 * 9/2005 Bjerrum .............. H01M 4/8605 429/513
9,954,240 B2 4/2018 Henkensmeier et al.
(Continued)

FOREIGN PATENT DOCUMENTS

CN 109585888 * 4/2019
KR 101703055 B1 2/2017

OTHER PUBLICATIONS

Kwan-Soo Lee et al., An operationally flexible fuel cell based on quaternary ammonium-biphosphate ion pairs, Nat. Energy. 2016, 1, 16120, Aug. 22, 2016, 7pp, 10.1038/NENERGY.2016.120.
(Continued)

*Primary Examiner* — Jonathan Crepeau
(74) *Attorney, Agent, or Firm* — Lempia Summerfield Katz LLC

(57) ABSTRACT

A high-temperature polymer electrolyte membrane fuel cell including a polymer of intrinsic microporosity that prevents phosphoric acid poisoning and a method for manufacturing the same are disclosed. It is possible to improve the electrochemical efficiency of high-temperature polymer electrolyte membrane fuel cells based on development of a polymer
(Continued)

of intrinsic microporosity with thermal stability and cationic conductivity.

8 Claims, 4 Drawing Sheets

(51) Int. Cl.
*H01M 4/88* (2006.01)
*H01M 8/10* (2016.01)
*H01M 8/1088* (2016.01)

(52) U.S. Cl.
CPC .. *H01M 8/1088* (2013.01); *H01M 2008/1095* (2013.01); *H01M 2300/0082* (2013.01)

(56) References Cited

U.S. PATENT DOCUMENTS

| | | | | |
|---|---|---|---|---|
| 10,622,657 | B1 | 4/2020 | Kim et al. | |
| 11,355,768 | B2 * | 6/2022 | Kim | H01M 8/1086 |
| 2016/0308229 | A1 | 10/2016 | Henkensmeier et al. | |
| 2021/0202971 | A1 * | 7/2021 | Kim | H01M 4/9075 |
| 2022/0021006 | A1 * | 1/2022 | Chae | C08G 65/4006 |

OTHER PUBLICATIONS

Peng Wang et al., Toward enhanced conductivity of hightemperature proton exchange membranes: development of novel PIM-1 reinforced PBI alloy membranes, Chem. Commun., 2019, 55, 6491, Jun. 11, 2019, 5pp, 10.1039/c9cc02102g.

Pranab Kumar Pramanick et al., Mechanistic study on iodine-catalyzed aromatic bromination of aryl ethers by N-Bromosuccinimide, Tetrahedron 73 (2017), Nov. 7, 2017, 10pp, https://doi.org/10.1016/j.tet.2017.10.073.

* cited by examiner

HIGH-TEMPERATURE PEMFC INCLUDING POLYMER OF INTRINSIC MICROPOROSITY PREVENTING PHOSPHORIC ACID POISONING AND METHOD OF MANUFACTURING THE SAME

CROSS-REFERENCE TO RELATED APPLICATION

This application claims under 35 U.S.C. § 119(a) the benefit of priority to Korean Patent Application No. 10-2022-0057315, filed on May 10, 2022, the entire contents of which are incorporated herein by reference.

BACKGROUND

(a) Technical Field

The present disclosure relates to a high-temperature polymer electrolyte membrane fuel cell including a polymer of intrinsic microporosity that prevents phosphoric acid poisoning, and a method for manufacturing the same. The present disclosure also relates to the improvement in the electrochemical efficiency of high-temperature polymer electrolyte membrane fuel cells based on development of a polymer of intrinsic microporosity having thermal stability and cationic conductivity.

(b) Background Art

High-temperature polymer electrolyte membrane fuel cells (HT PEMFCs) may be operated at a temperature in a range of 120 to 200° C. The gas stream may be unhumidified or may contain water if the cell is connected to a reformer. In this state, liquid water cannot exist unless very high pressure is applied. For this reason, electrolytes may be based on phosphoric acid (PA).

Current high-temperature polymer electrolyte membrane fuel cells have problems such as leakage of phosphoric acid from the polymer membrane during operation, a decrease in the cation conductivity of the polymer membrane resulting therefrom, and a decrease in electrochemical performance due to phosphoric acid poisoning of the catalyst.

However, there is a need for the development of novel materials for high-temperature polymer electrolyte membrane fuel cells because high-temperature polymer electrolyte membrane fuel cells have advantages of eliminating the necessity of a CO remover, humidifier, and condensate treatment device and of exhibiting high CO resistance and catalytic activity, compared to low-temperature fuel cells.

The above information disclosed in this Background section is only for enhancement of understanding of the background, and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is one object of the present disclosure to provide a high-temperature polymer electrolyte membrane fuel cell that is capable of improving the electrochemical efficiency by developing a polymer of intrinsic microporosity having thermal stability and cationic conductivity.

It is another object of the present disclosure to prevent phosphoric acid leakage and catalyst poisoning from the polymer membrane during operation of fuel cells and reduction in electrochemical performance resulting therefrom.

The objects of the present disclosure are not limited to those described above. Other objects of the present disclosure are understood from the following description and are able to be implemented by the methods and compositions defined in the claims and combinations thereof.

In one aspect, the present disclosure provides a high-temperature polymer electrolyte membrane fuel cell including an electrode and an electrolyte membrane, wherein at least one of the electrode and the electrolyte membrane includes a polymer of intrinsic microporosity (PIM).

The polymer of intrinsic microporosity (PIM) may be represented by the following Formula 1:

[Formula 1]

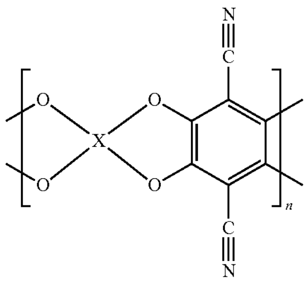

wherein X includes

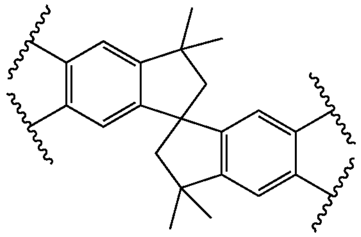

,

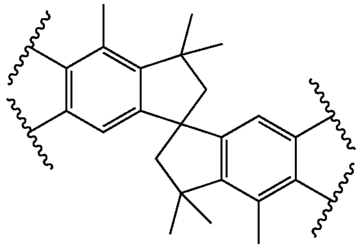

,

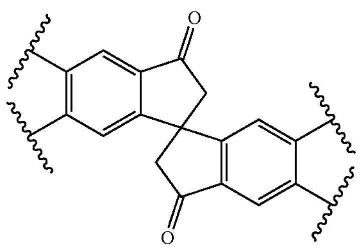

,

-continued
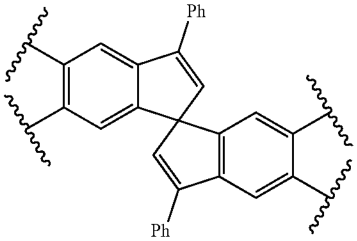
,
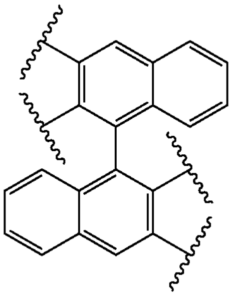
,
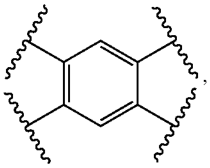
,
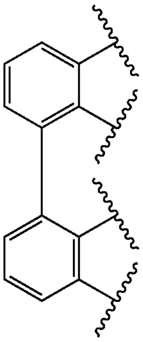
,
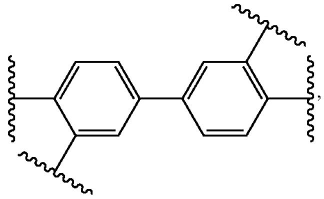
,
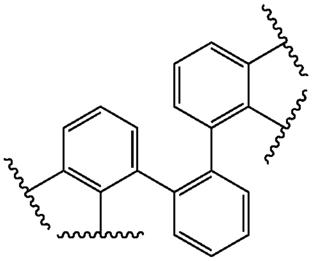
,
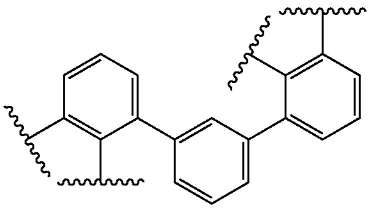
,
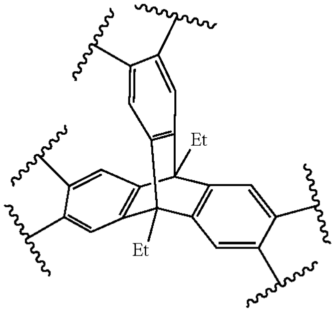
,
-continued
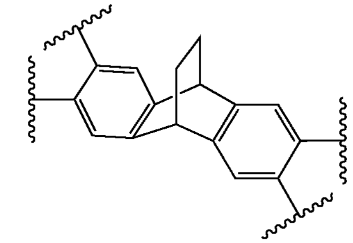
,
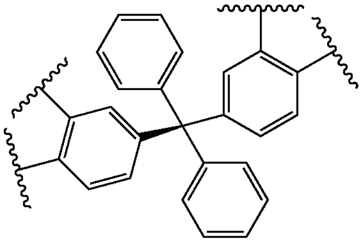
,
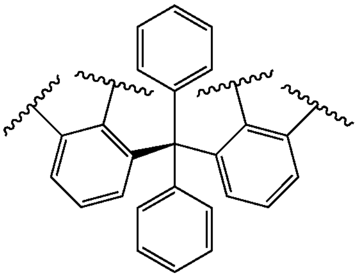
,
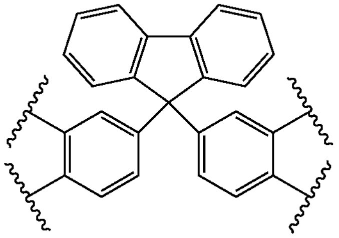
,
or combinations thereof, and wherein n is an integer in a range of 10 to 30.
The polymer of intrinsic microporosity may be represented by the following Formula 2:
[Formula 2]
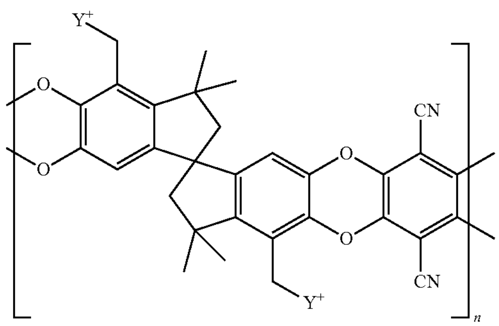
wherein Y includes a proton-conductive group such as amine, amine derivatives, or a combination thereof, and wherein n is an integer in a range of 10 to 30.

Y may include

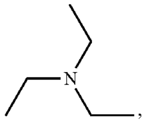,

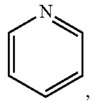,

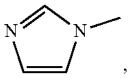,

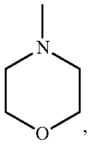, or combinations thereof.

The polymer of intrinsic microporosity may be represented by the following Formula 3:

[Formula 3]

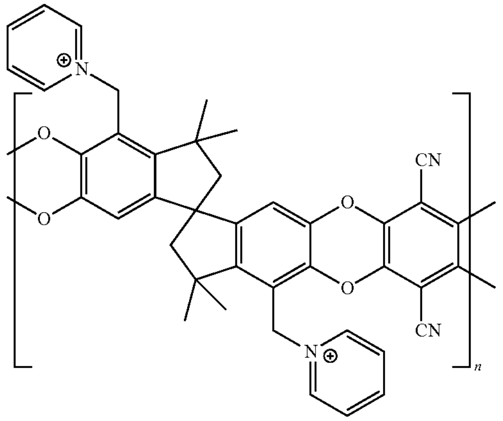

wherein n is an integer in a range of 10 to 30.

The polymer of intrinsic microporosity may be represented by the following Formula 4:

[Formula 4]

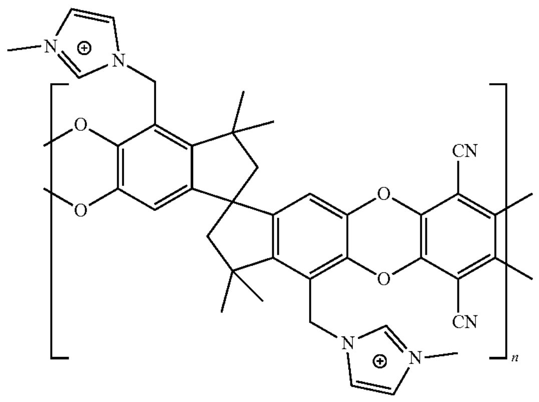

wherein n is an integer in a range of 10 to 30.

The electrode may include a catalyst, an ionomer including a phosphoric acid group, and a polymer of intrinsic microporosity, and the polymer of intrinsic microporosity may bind to the surface of the catalyst.

The electrode may include 60 wt. % to 70 wt. % of the catalyst, 10 wt. % to 20 wt. % of the ionomer, and 5 wt. % to 10 wt. % of the polymer of intrinsic microporosity.

In another aspect, the present disclosure provides a method of manufacturing a high-temperature polymer electrolyte membrane fuel cell including preparing a polymer of intrinsic microporosity, reacting the polymer of intrinsic microporosity with a tertiary amine, and producing at least one of an electrode and an electrolyte membrane including the polymer of intrinsic microporosity.

The preparing the polymer of intrinsic microporosity may include adding tetrahydroxy hexamethylspirobisindane, 2,3,5,6-tetrafluoroterephthalonitrile (TFTPN) and potassium carbonate ($K_2CO_3$) to N-methyl-2-pyrrolidone (NMP) to provide a mixture, followed by stirring the mixture, and reacting the stirred mixture with N-bromosuccinimide (NBS) to provide the polymer of intrinsic microporosity.

The tertiary amine may pyridine, imidazole, 1-methylimidazole, 2-methylimidazole, 4(5)-methylimidazole, 1-vinylimidazole, 1,2-dimethylimidazole, 2-ethylimidazole, 1-allylimidazole, 2-methyl-1-vinylimidazole, 2-propylimidazole, 2-ethyl-4-methylimidazole, 2-isopropylimidazole, 4-imidazole carboxylic acid, imidazole-2-carboxylic acid, imidazole [1,2,a] pyridine, benzimidazole, 4-azabenzimidazole, 1-butylimidazole, 5-methylbenzimidazole, 2-methylbenzimidazole, 2-phenylimidazole, 1-phenylimidazole, 4-phenylimidazole, 2-ethylbenzimidazole, 5,6-dimethylbenzimidazole, or combinations thereof.

The reacting of the polymer of intrinsic microporosity with the tertiary amine may be performed at a temperature in a range of 110° C. to 150° C.

The reacting of the halogenated polymer with the tertiary amine may be performed for a period of time in a range of 20 to 30 hours.

Other aspects and embodiments of the disclosure are discussed infra.

BRIEF DESCRIPTION OF THE DRAWINGS

The above and other features of the present disclosure are now described in detail with reference to certain exemplary embodiments thereof, illustrated in the accompanying drawings which are given hereinbelow by way of illustration only, and thus are not limitative of the present disclosure, and wherein.

DETAILED DESCRIPTION

Figure 1:
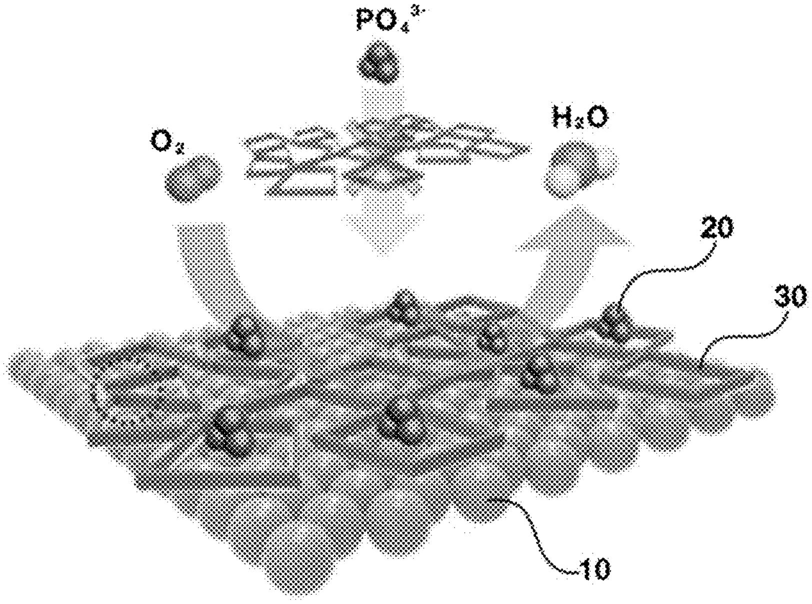
FIG. 1 shows a portion of an electrode of a high-temperature polymer electrolyte membrane fuel cell according to an embodiment of the present disclosure.

The objects described above, as well as other objects, features, and advantages, are understood from the following embodiments with reference to the attached drawings. However, the present disclosure is not limited to the embodiments and may be embodied in different forms. The embodiments are suggested only to offer a thorough and complete understanding of the disclosed context and to sufficiently inform those skilled in the art of the technical concept of the present disclosure.

Like reference numbers refer to like elements throughout the description of the figures. In the drawings, the sizes of structures may be exaggerated for clarity. Although the terms "first," "second," etc. may be used herein to describe various elements, these elements should not be construed as being limited by these terms, which are used only to distinguish one element from another. For example, within the scope defined by the present disclosure, a "first" element may be referred to as a "second" element, and similarly, a "second" element may be referred to as a "first" element. Singular forms are intended to include plural forms as well unless the context clearly indicates otherwise.

The terms "comprises" and/or "has," when used in this specification, specify the presence of stated features, integers, steps, operations, elements, components, or combinations thereof, but do not preclude the presence or addition of one or more other features, integers, steps, operations, elements, components, or combinations thereof. In addition, when an element such as a layer, film, region, or substrate is referred to as being "on" another element, it can be directly on the other element, or an intervening element may also be present. Further, when an element such as a layer, film, region, or substrate is referred to as being "under" another element, it can be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

The high-temperature polymer electrolyte membrane fuel cell according to the present disclosure includes an electrode and an electrolyte membrane, wherein at least one of the electrode and the electrolyte membrane includes a polymer of intrinsic microporosity (PIM).

The polymer of intrinsic microporosity (PIM) may have a spiro-center or have repeat units of dibenzodioxane-based ladder-type structures bound to sites of contortion that may contain severe structural disturbances.

The polymer of intrinsic microporosity (PIM) according to the present disclosure has a microporous structure to reduce phosphoric acid poisoning of the catalyst. In addition, the PMI may include a quaternary amine in the molecular structure thereof to secure proton conductivity of the polymer. That is, the PMI is a novel polymer that has both porosity and proton conductivity and has an ionic bond interaction having a stronger binding energy than the acid-base interaction between the conventional PBI (polybenzimidazole)-based membrane and phosphoric acid, thereby preventing electrode poisoning in the polymer electrolyte membrane doped with phosphoric acid during fuel cell operation.

The polymer of intrinsic microporosity (PIM) may be represented by the following Formula 1:

[Formula 1]

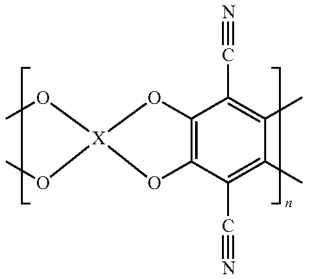

wherein X includes:

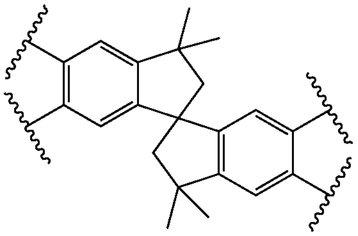

,

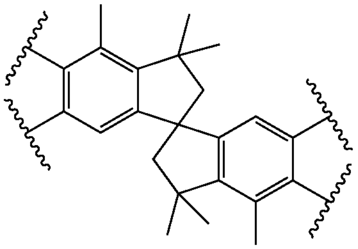

,

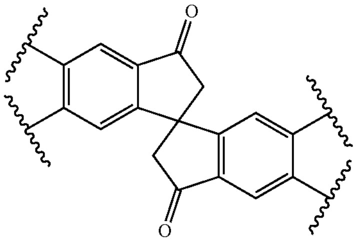

,

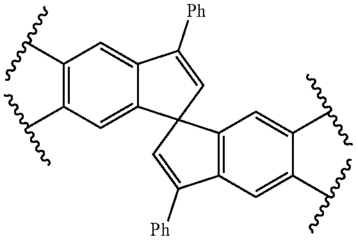

,

-continued
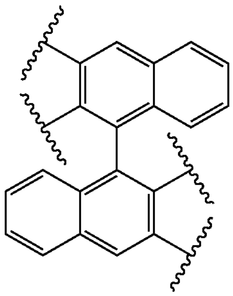
,
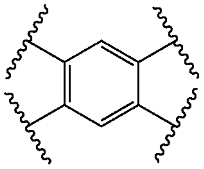
,
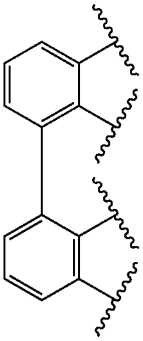
,
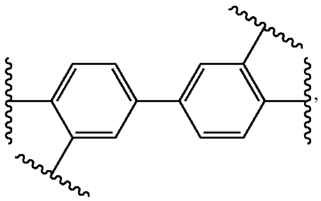
,
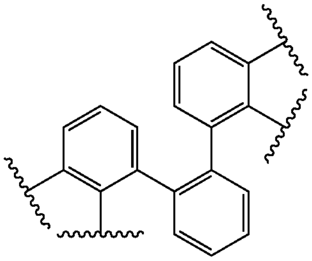
,
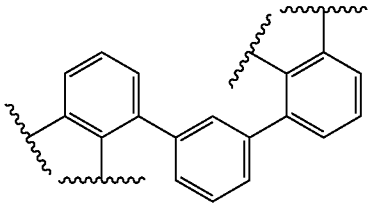
,
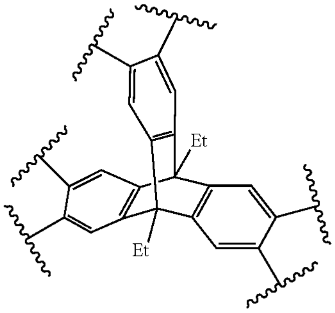
,
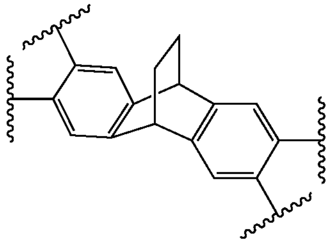
,
-continued
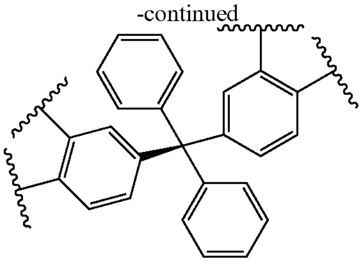
,
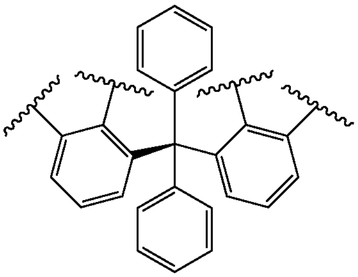
,
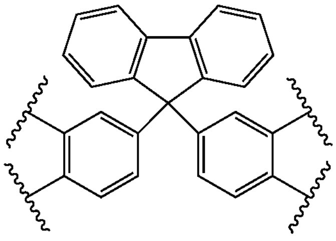
,
or combinations thereof, and wherein n is an integer in a range of 10 to 30.
The polymer of intrinsic microporosity may be represented by the following Formula 2:
[Formula 2]
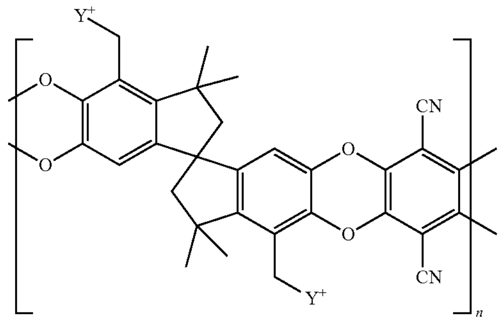
wherein Y includes amine, amine derivatives, or a combination thereof, and wherein n is an integer in a range of 10 to 30.
Y may include
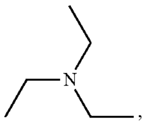
,
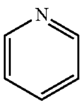
,
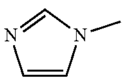
,
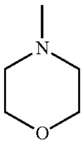
,
or combinations thereof.

The polymer of intrinsic microporosity may be represented by the following Formula 3:

[Formula 3]

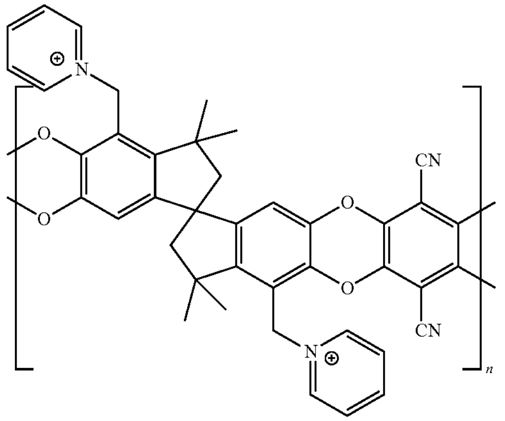

wherein n is an integer in a range of 10 to 30.

The polymer of intrinsic microporosity may be represented by the following Formula 4:

[Formula 4]

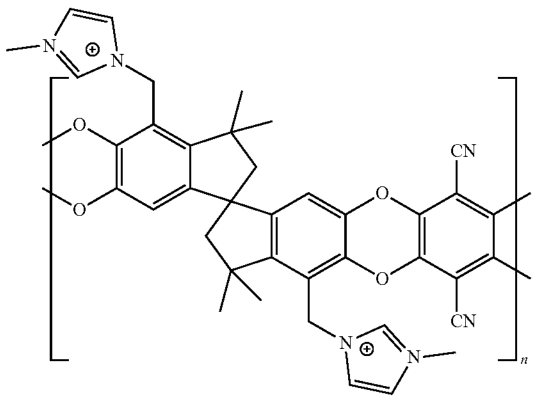

wherein n is an integer in a range of 10 to 30.

The polymer of intrinsic microporosity has effects of preventing phosphoric acid poisoning and securing proton conductivity based on the porous structure through a reaction with a tertiary amine because a quaternary amine is introduced into the polymer.

FIG. 1 illustrates a portion of an electrode of a high-temperature polymer electrolyte membrane fuel cell according to an embodiment of the present disclosure. Referring to this, the electrode of the high-temperature polymer electrolyte membrane fuel cell according to the present disclosure includes a catalyst 10, an ionomer 20 including a phosphoric acid group, and an electrolyte membrane 30 including a polymer of intrinsic microporosity, wherein the polymer of intrinsic microporosity binds to the surface of the catalyst.

The catalyst 10 may include platinum, palladium, cobalt, gold, ruthenium, tin, molybdenum, rhodium, iridium, bismuth, copper, yttrium, chromium, alloys thereof, and combinations thereof. In one embodiment, the catalyst 10 includes platinum or an alloy thereof.

The ionomer 20 may include a perfluorosulfonic acid polymer, a hydrocarbon polymer, a polybenzimidazole polymer, or a combination thereof. In one example, the ionomer 20 includes a polybenzimidazole polymer having a phosphoric acid group.

The electrode may include 60 wt. % to 70 wt. % of the catalyst, 10 wt. % to 20 wt. % of the ionomer, and 5 wt. % to 10 wt. % of the polymer of intrinsic microporosity.

The method of manufacturing a high-temperature polymer electrolyte membrane fuel cell according to the present disclosure includes preparing a polymer of intrinsic microporosity, reacting the polymer of intrinsic microporosity with a tertiary amine, and producing at least one of an electrode and an electrolyte membrane including the polymer of intrinsic microporosity.

The preparing the polymer of intrinsic microporosity may include adding tetrahydroxy hexamethylspirobiindane, 2,3,5,6-tetrafluoroterephthalonitrile (TFTPN) and potassium carbonate ($K_2CO_3$) to N-methyl-2-pyrrolidone (NMP), followed by stirring, and reacting the prepared polymer with N-bromosuccinimide (NBS).

The tetrahydroxy hexamethylspirobisindane and 2,3,5,6-tetrafluoroterephthalonitrile (TFTPN) may be performed as follows through nucleophilic aromatic substitution (SNAr).

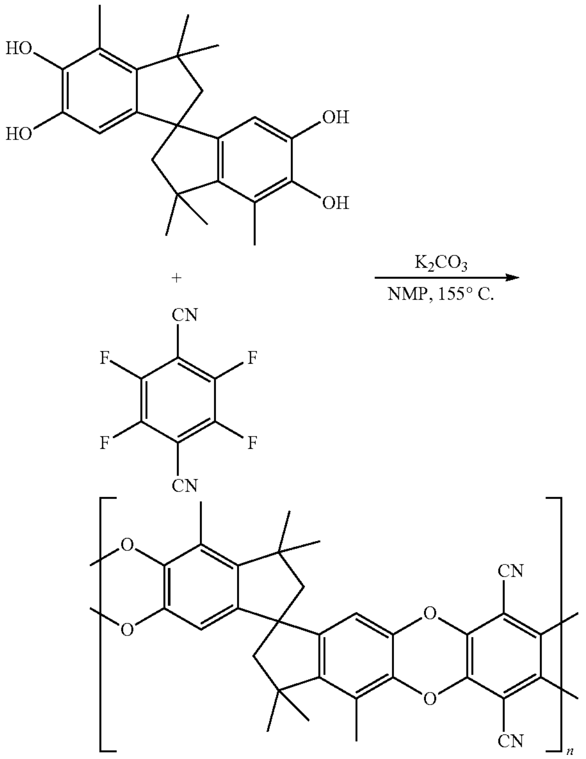

The reacting of the prepared polymer with N-bromosuccinimide (NBS) is performed as follows through selective bromination at the methyl of the toluene structure (radical-initiated side chain bromination). If, as in the present disclosure, the polymer of intrinsic microporosity has a benzene structure rather than a toluene structure, electrophilic aromatic bromination rather than side chain bromination occurs under the corresponding reaction conditions and introduction of quaternary amines via the subsequent nucleophilic substitution ($S_N2$) with tertiary amine is thus impossible.

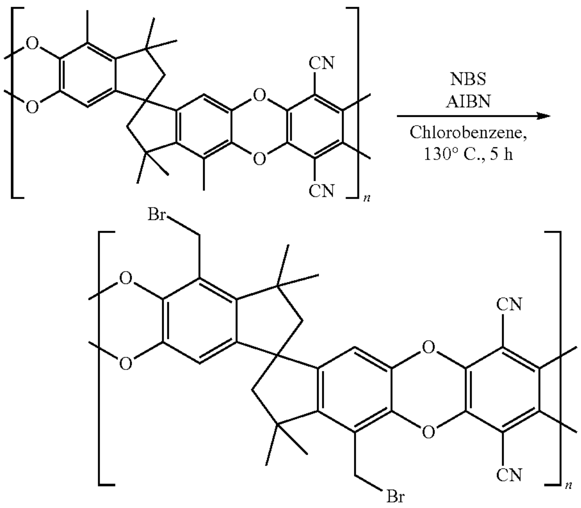

The reacting the polymer of intrinsic microporosity with the tertiary amine enables the polymer of intrinsic microporosity having an ionic structure to be synthesized by introducing a quaternary amine through nucleophilic substitution ($S_N2$) between the polymer and any of various types of tertiary amines and may be performed as follows.

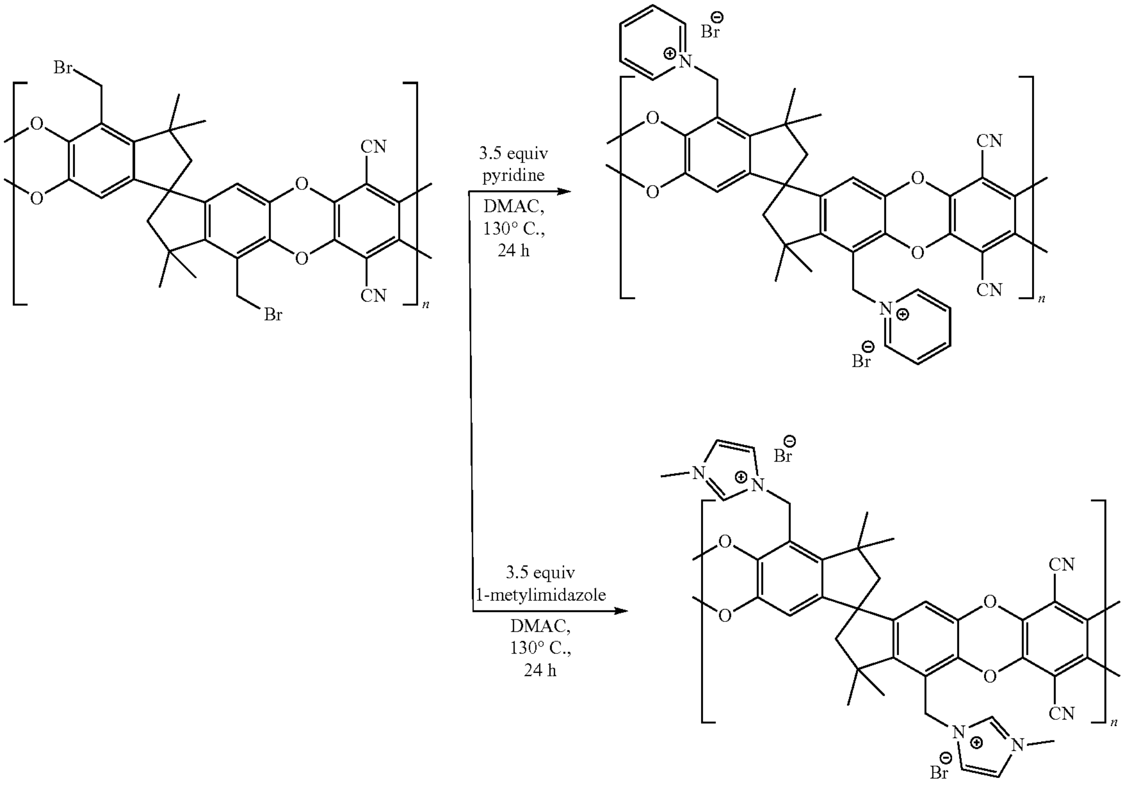

The tertiary amine may include pyridine, imidazole, 1-methylimidazole, 2-methylimidazole, 4(5)-methylimidazole, 1-vinylimidazole, 1,2-dimethylimidazole, 2-ethylimidazole, 1-allylimidazole, 2-methyl-1-vinylimidazole, 2-propylimidazole, 2-ethyl-4-methylimidazole, 2-isopropylimidazole, 4-imidazole carboxylic acid, imidazole-2-carboxylic acid, imidazole [1,2,a] pyridine, benzimidazole, 4-azabenzimidazole, 1-butylimidazole, 5-methylbenzimidazole, 2-methylbenzimidazole, 2-phenylimidazole, 1-phenylimidazole, 4-phenylimidazole, 2-ethylbenzimidazole, 5,6-dimethylbenzimidazole, or combinations thereof. In certain examples, the tertiary amine includes pyridine or 1-methylimidazole.

The polymer of intrinsic microporosity of the present disclosure is effective in realizing commercialization, mass production, and economic efficiency because it is prepared through an easy and simple synthetic route having few side reactions, such as bromination and nucleophilic substitution, as described above.

Hereinafter, the present disclosure is described in more detail with reference to the following examples and comparative examples. However, these examples are provided only for better understanding of the present disclosure, and thus should not be construed as limiting the scope of the present disclosure.

Examples 1 and 2

Examples 1 and 2, which are polymers of intrinsic microporosity, were prepared through the following process.

Example 1

Tetrahydroxy hexamethylspirobisindane, 2,3,5,6-tetrafluoroterephthalonitrile (TFTPN), and potassium carbonate ($K_2CO_3$) were added to N-methyl-2-pyrrolidone (NMP), followed by stirring at 155° C. Then, the stirred polymer was added to azobisisobutyronitrile (AIBN) and chlorobenzene, and the resulting reaction product was reacted with N-bromosuccinimide (NBS) at 130° C. for 5 hours. The reacted polymer was reacted with pyridine in the presence of dimethylacetamide (DMAC) at 130° C. for 24 hours to obtain a polymer of intrinsic microporosity.

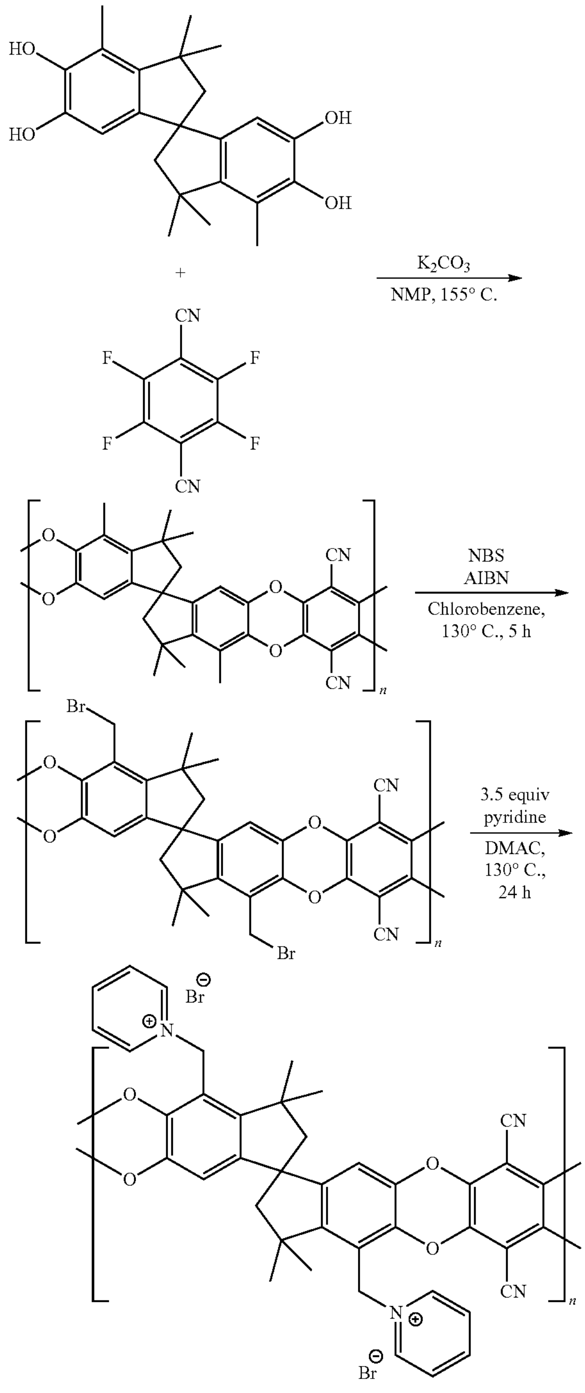

Example 2

Tetrahydroxy hexamethylspirobisindane, 2,3,5,6-tetrafluoroterephthalonitrile (TFTPN), and potassium carbonate ($K_2CO_3$) were added to N-methyl-2-pyrrolidone (NMP), followed by stirring at 155° C. Then, the stirred polymer was added to azobisisobutyronitrile (AIBN) and chlorobenzene, and the resulting reaction product was reacted with N-bromosuccinimide (NBS) at 130° C. for 5 hours. The reacted polymer was reacted with 1-methylimidazole in the presence of dimethylacetamide (DMAC) at 130° C. for 24 hours to obtain a polymer of intrinsic microporosity.

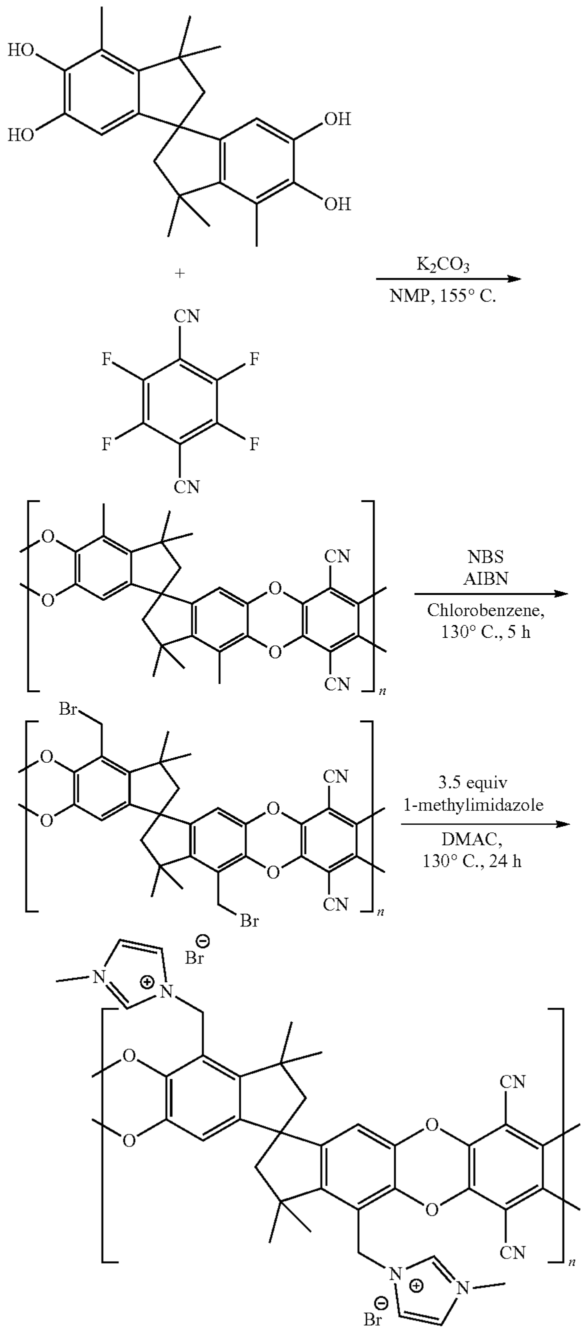

Experimental Example 1: Thermal Stability Test

Thermogravimetric analysis (TGA) was performed in order to determine the thermal stability of the polymers of intrinsic microporosity prepared in Examples 1 and 2. The TGA was performed under nitrogen and air conditions and the temperature at which a weight loss of 5% from the initial weight occurred was expressed as $T_d$.

Figure 2:
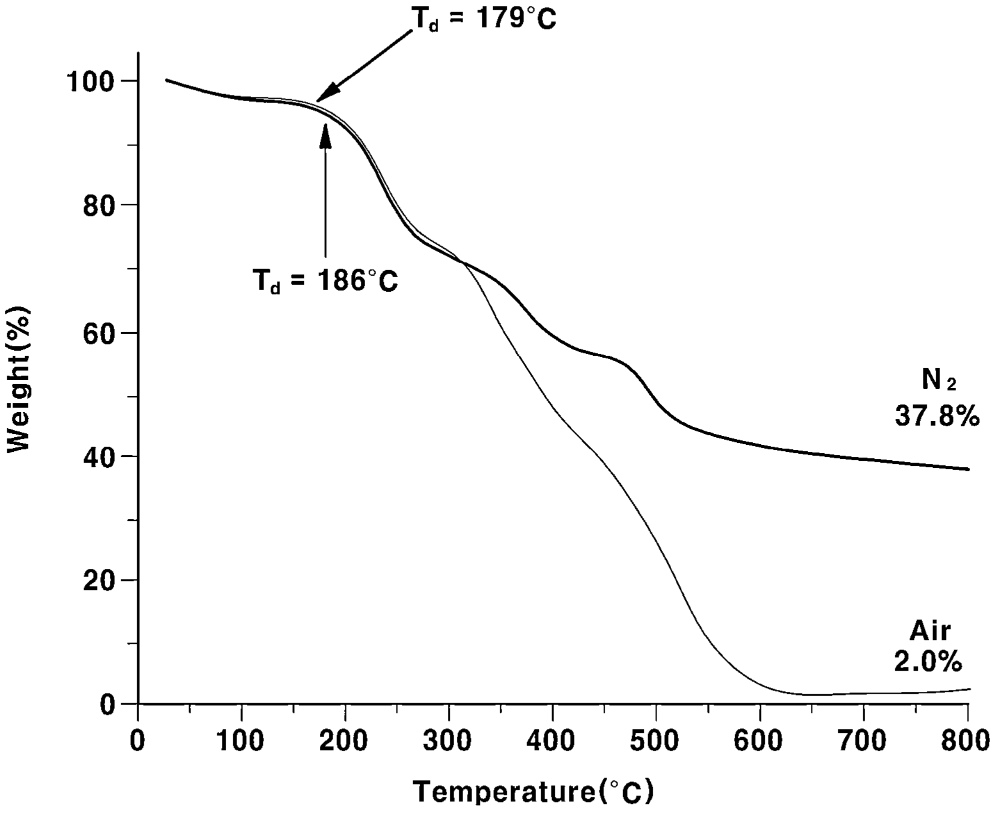
FIG. 2 shows a TGA (thermogravimetric analysis) graph obtained in Example 1.
Figure 3:
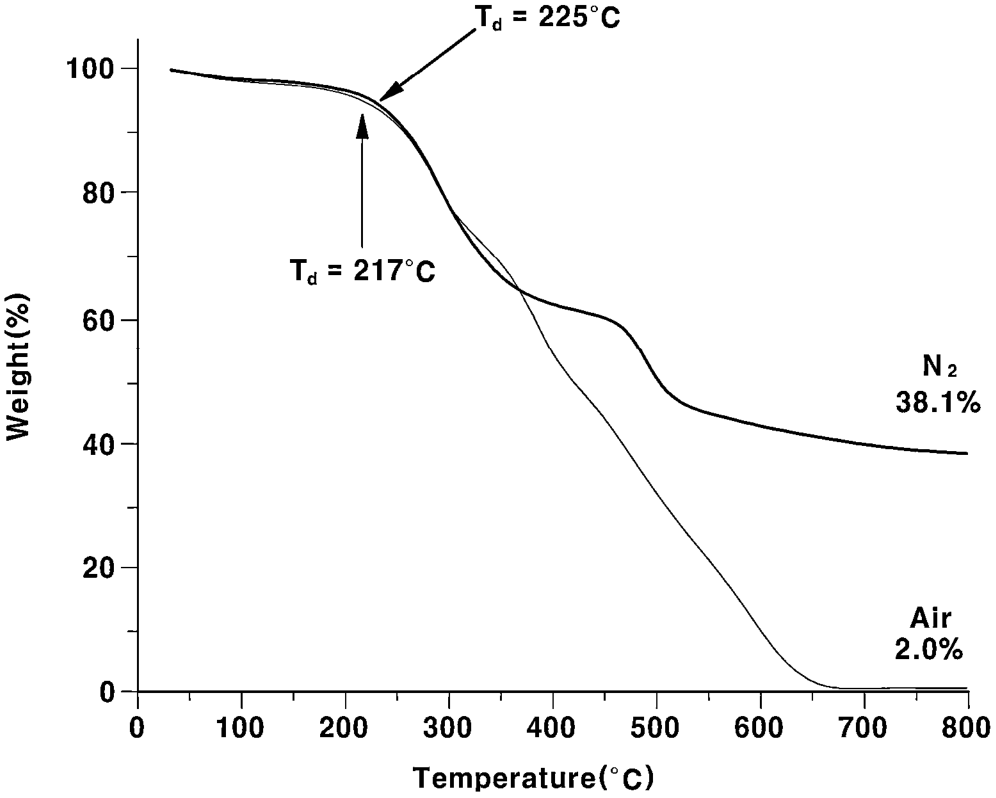
FIG. 3 shows a TGA (thermogravimetric analysis) graph obtained in Example 2.

FIG. 2 is a TGA (thermogravimetric analysis) graph obtained in Example 1. FIG. 3 is a TGA (thermogravimetric analysis) graph obtained in Example 2. As can be seen from FIGS. 2 and 3, the $T_d$ of the polymer of intrinsic microporosity according to Example 1 in which the pyridinium functional group was introduced was 179° C. under a nitrogen atmosphere and 186° C. under an oxygen atmosphere, whereas the $T_d$ of the polymer of intrinsic microporosity according to Example 2 in which the imidazolium functional group was introduced was 225° C. under a nitrogen atmosphere and 217° C. under an oxygen atmosphere. The results showed that the polymer of intrinsic microporosity of Example 2 has higher thermal stability than that of Example 1.

Examples 3 and 4, Comparative Example 1 and Experimental Example 2: Test to Determine Anti-Poisoning Effect An electrode was prepared by adding a Pt/C catalyst and phosphoric acid in order to determine the anti-poisoning effect of the polymer of intrinsic microporosity. Oxygen reduction reaction (ORR) activity of the prepared electrodes in 02 saturated 0.1M $HClO_4$ and $O_2$ saturated 0.1M $HClO_4$ along with 0.05M phosphoric acid was measured. The results of measurement are shown in Table 1 and FIG. 4.

Example 3

An electrode was produced using 10 mg of a 50 wt. % catalyst TKK Pt/C (TEC10E50E, loading amount of 20 μg/$cm^2$), IPA (isopropyl alcohol) and DIW as solvents, a perfluorosulfonic acid polymer as an ionomer, and 1 mg of

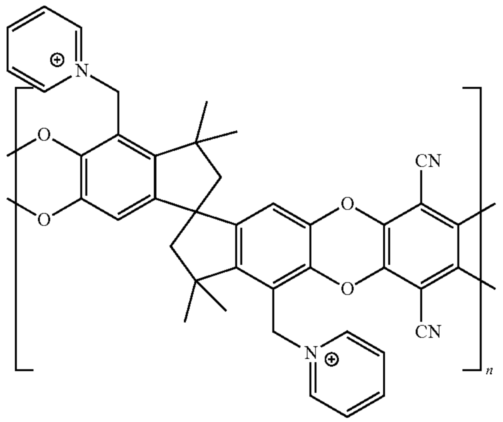

as a polymer of intrinsic microporosity.

Example 4

An electrode was produced using 10 mg of a 50 wt. % catalyst TKK Pt/C (TEC10E50E, loading amount of 20 μg/$cm^2$), IPA (isopropyl alcohol) and DIW as solvents, a perfluorosulfonic acid polymer as an ionomer, and 1 mg of

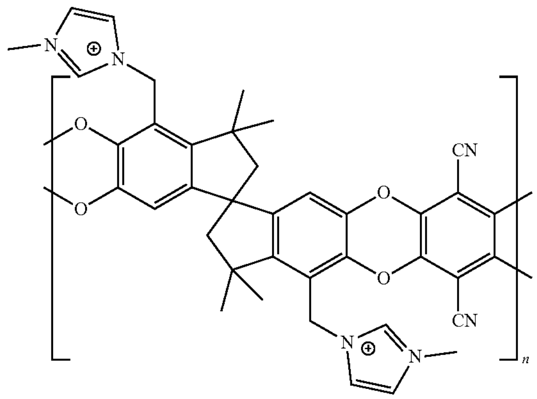

as a polymer of intrinsic microporosity.

Comparative Example 1

An electrode was produced using 10 mg of a 50 wt. % catalyst TKK Pt/C (TEC10E50E, loading amount of 20 ug/$cm^2$), IPA (isopropyl alcohol) and DIW as solvents, and a perfluorosulfonic acid polymer as an ionomer.

TABLE 1

| | ΔMA(%) | $\Delta E_{1/2}$(mV) | ΔEIS(%) |
|---|---|---|---|
| Comparative Example 1 | 76.8 | 131 | 6.29 |
| Example 3 | 49.2 | 27 | 6.04 |
| Example 4 | 56.5 | 34 | 7.25 |

Figure 4:
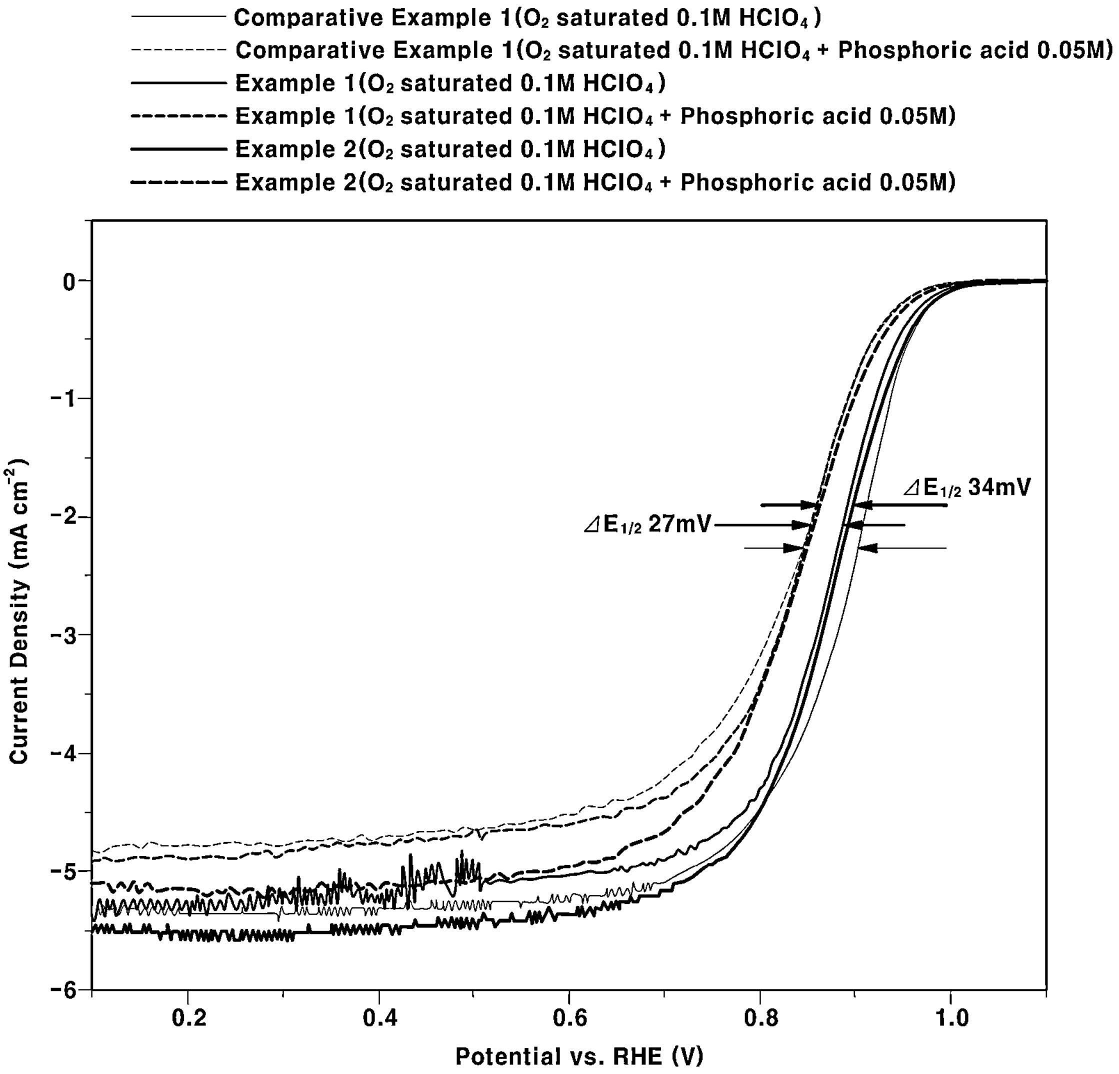
FIG. 4 shows the ORR (objective response rate) measured in Experimental Example 2 of the present disclosure.

FIG. 4 is a graph showing the ORR (objective response rate) measured in Experimental Example 2 of the present disclosure. As can be seen from Table 1 and FIG. 4, the half-wave potential difference is 131 mV in the electrode of Comparative Example 1 not including the polymer of intrinsic microporosity, the half-wave potential difference is 27 mV in Example 1, and the half-wave potential difference is 34 mV in Example 2. That is, the performance of Examples 1 and 2 was decreased by about ¼ of Comparative Example 1.

In addition, the change of mass activity was 76.8% in Comparative Example 1, 49.2% in Example 1, and 56.5% in Example 2, which indicates that the decrease of mass activity of Example was smaller than that of Comparative Example.

Therefore, the high-temperature polymer electrolyte membrane fuel cell according to the present disclosure includes a polymer of intrinsic microporosity capable of preventing phosphoric acid poisoning, thereby maximizing the electrochemical efficiency of the fuel cell based on both thermal stability and cationic conductivity thereof.

As is apparent from the foregoing, the high-temperature polymer electrolyte membrane fuel cell according to the present disclosure is capable of reducing leakage of phosphoric acid and inhibiting phosphoric acid poisoning using a polymer material having a microporous structure, thereby providing an effect of reducing the performance degradation problem of the high-temperature fuel cell.

In addition, the novel polymer according to the present disclosure is effective for commercialization, mass production, and economic efficiency because it is synthesized through an easy and simple synthetic route with few side reactions such as bromination reaction and nucleophilic substitution.

The effects of the present disclosure are not limited to those mentioned above. It should be understood that the effects of the present disclosure include all effects that can be inferred from the description of the present disclosure.

The present disclosure has been described in detail with reference to embodiments thereof. However, it will be appreciated by those skilled in the art that changes may be made in these embodiments without departing from the principles and spirit of the present disclosure, the scope of which is defined in the appended claims and their equivalents.

What is claimed is:

1. A fuel cell comprising:

an electrode; and an electrolyte membrane, wherein at least one of the electrode or the electrolyte membrane comprises a polymer of intrinsic microporosity, and wherein the polymer of intrinsic microporosity is represented by:

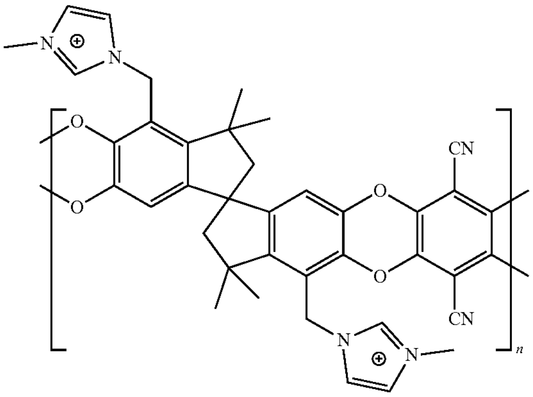

wherein n is an integer in a range of 10 to 30.

2. The fuel cell of claim 1, wherein the electrode comprises:

a catalyst;

an ionomer comprising a phosphoric acid group; and the polymer of intrinsic microporosity, wherein the polymer of intrinsic microporosity binds to a surface of the catalyst.

3. The fuel cell of claim 1, wherein the electrode comprises:

60 wt. % to 70 wt. % of a catalyst;

10 wt. % to 20 wt. % of an ionomer; and 5 wt. % to 10 wt. % of the polymer of intrinsic microporosity.

4. A method of manufacturing a fuel cell, the method comprising:

preparing a polymer of intrinsic microporosity;

reacting the polymer of intrinsic microporosity with a tertiary amine; and producing an electrode and an electrolyte membrane, wherein at least one of the electrode and the electrolyte membrane comprise the polymer of intrinsic microporosity, wherein the polymer of intrinsic microporosity is represented by:

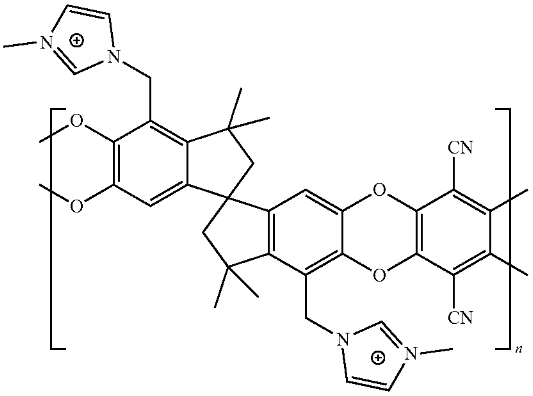

wherein n is an integer in a range of 10 to 30.

5. The method of claim 4, wherein the reacting of the polymer of intrinsic microporosity with the tertiary amine is performed at a temperature in a range of 110° C. to 150° C.

6. The method of claim 4, wherein the reacting of the polymer of intrinsic microporosity with the tertiary amine is performed for a period of time in a range of 20 to 30 hours.

7. The method of claim 4, wherein the electrode comprises:

a catalyst;

an ionomer comprising a phosphoric acid group; and the polymer of intrinsic microporosity, wherein the polymer of intrinsic microporosity binds to a surface of the catalyst.

8. The method of claim 4, wherein the electrode comprises:

60 wt. % to 70 wt. % of a catalyst;

10 wt. % to 20 wt. % of an ionomer; and 5 wt. % to 10 wt. % of the polymer of intrinsic microporosity.

* * * * *